United States Patent Office 2,870,280
Patented Jan. 20, 1959

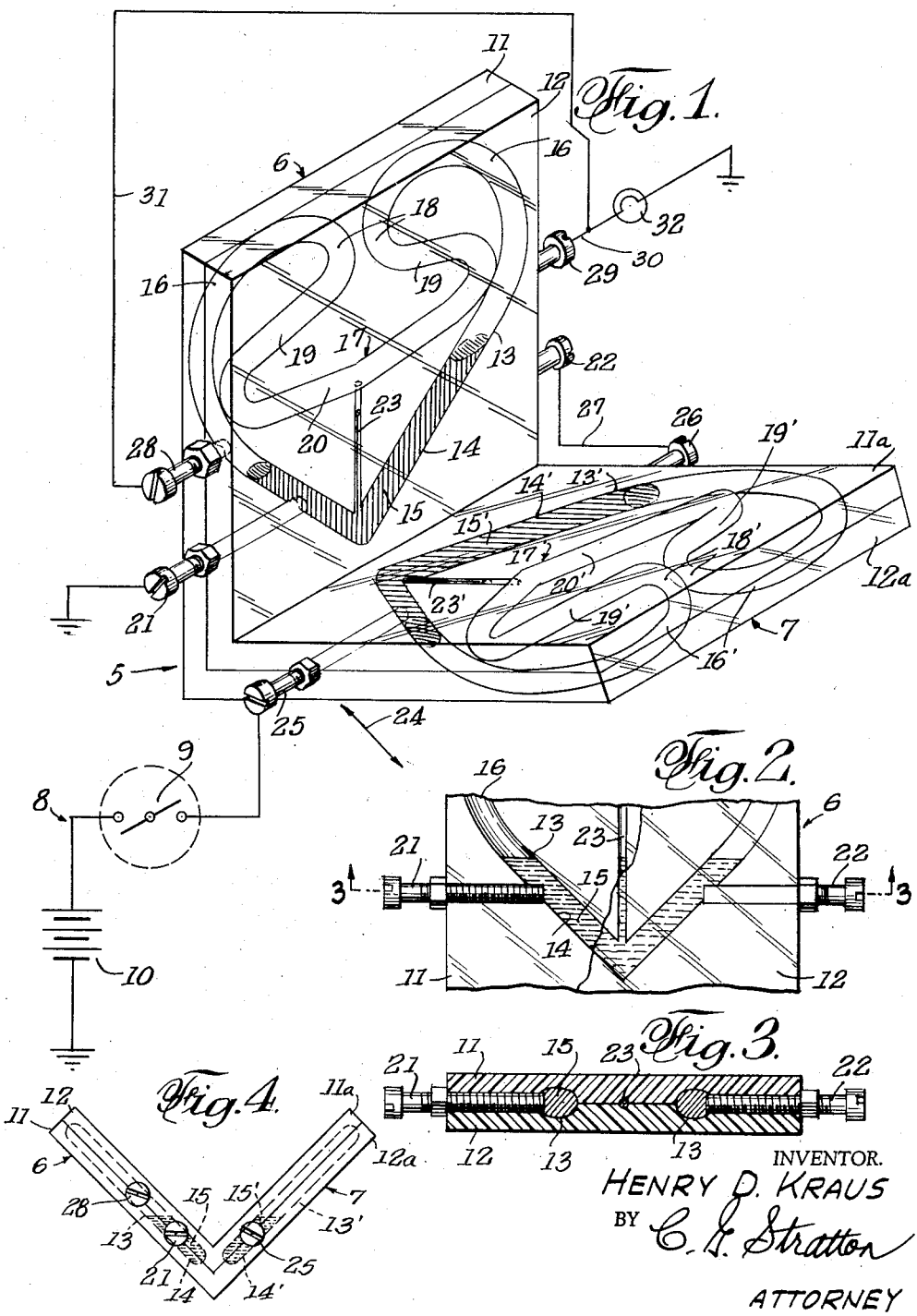

2,870,280
AUTOMOTIVE SAFETY SWITCH

Henry D. Kraus, Los Angeles, Calif.

Application December 9, 1957, Serial No. 701,616

13 Claims. (Cl. 200—61.52)

This invention relates to a safety switch to insure opening of the ignition circuit in time of emergency, such as when a vehicle, carrying such switch, is either upset or sustains a severe impact, thereby eliminating fire hazard.

An object of the present invention is to provide a switch to control the ignition circuit of an automotive vehicle so that said circuit is cut on impact in any direction or when the angle of the vehicle is so great as to indicate that the same either is rolling over or is dangerously tipped or tilted from a normal position.

Since fire is a great hazard during a serious accident involving automotive vehicles, because of the almost certain spillage of combustible fluids such as gasoline and oil, the provision of means to open the high tension ignition circuit which may ignite such spilled liquids, constitutes a very important safety feature. If it can be assured that after instantaneous interruption of the ignition circuit during collision impact or other such emergency that the motor of the vehicle will not re-start, the danger of such igniting of inflammable liquids is largely minimized or entirely eliminated. Therefore, it is another object of the invention to provide a switch of the character indicated that will insure the circuit that is interrupted remaining open for such a period of time that would prevent a motor from re-starting, the present switch embodying a time delay that would carry out the above-stated function.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows and the following description merely describes, preferred embodiments of the present invention, which are given by way of illustration or example only.

In the drawing, like reference characters designate similar parts in the several views.

Fig. 1 is a perspective view of a switch embodying a form of the present invention, the same, in diagrammatic form, being shown in connection with an ignition circuit which it controls.

Fig. 2 is a fragmentary elevational view showing a detail of construction of the switch illustrated in Fig. 1.

Fig. 3 is a cross-sectional view as taken on the line 3—3 of Fig. 2.

Fig. 4 is an edge view of the preferred arrangement of the present switch.

The automotive safety switch that is illustrated comprises, generally, a housing 5 having embodied therein inclined switches 6 and 7. These switches are at an angle to both the horizontal and vertical and preferably are arranged as indicated in Fig. 4. An electric ignition circuit 8 includes the conventional ignition switch 9 and power source 10 and is controlled by the switches 6 and 7 under conditions of impact and/or up-ending of an automotive vehicle provided with said switches and the mentioned circuit.

The switches 6 and 7 are disposed at the same but opposite angles. Both said switches, as will be later seen, respond to vehicle tilt and impact in the same way, except one responds to impact involving the front of a vehicle and the other to impact involving the rear of the vehicle.

The housing portion of the switch 6 comprises sheets 11 and 12 here shown as fused together, and the switch part 7 is shown with sheets 11a and 12a similarly fused together. It will be understood that the connection of the sheets may be effected in other ways, providing the switch components are retained within the interior of the housing 5.

The sheets 11, 11a, 12 and 12a that comprise the housings of the two switches are preferably formed of a rigid plastic material of which "Lucite" is an example. Other comparable dielectric materials may be used for the instant purpose.

The two switches 6 and 7 are alike and function in the same way, except that they assume "off" positions by impacts from opposite directions, although both switches may function when a vehicle in which they are carried is tipped or tilted laterally to a high degree or rolls over.

The switch 6 comprises a groove or channel 13 that is formed part in sheet 11 and part in sheet 12, as illustrated in Fig. 3. Said groove is formed with a portion 14 that is normally adapted to hold a quantity of mercury or other electrically-conducting liquid 15. The groove portion 14 comprises divergent passages that are directed toward opposite sides of the housing 5 and each of said passages continues as a re-entrantly curved passage 16. The groove passages 14 preferably diverge at about 90°. The curved passages 16 turn toward each other and terminate as a trap 17 that is defined between closely spaced curved passage portions 18, downwardly divergent passages 19, and mercury-collecting, substantially horizontal passage 20. The latter slopes toward a preferably central well. If the switch is retained in an upside-down position from that shown the mercury 15 will, of course, occupy the passage portions 16 and 18. Then, when the vehicle is righted, the mercury will find its position, in whole or in part, in the trap 17 as above enumerated. Of course, any exaggerated tipping of switch 6 will splash the mercury into the trap from which it cannot return to portion 14 through passages 16 and 18.

Two terminals 21 and 22 are in electrical connection with the mercury, and when the mercury is in the passage portions 14, it bridges such terminals. This is the normal closed condition of the switch. However, when the mercury has been displaced from the passage portions 14, there will be a gap between the terminals 21 and 22, and the switch will be open. Thus, only when mercury is restored to the passage portions 14 will the switch again be connected in circuit.

Restoration of the switch from open to closed condition is arranged on a time-delay basis and follows from leakage of mercury from the trap 17 back to the passage portions 14, as through the medium of a relatively small bleed passage 23 that connects said trap and said passage portions 14. It will be realized that the size of the passage 23 controls the time delay in restoring the switch 6 to closed condition. In practice, the same may be as short as ten to twenty seconds or may be as long as two or three minutes.

The arrow-headed line 24 in Fig. 1 represents the horizontal with respect to the switch. Thus, it will be evident that the switch 7 is tilted upwardly with respect to the horizontal in such direction as to retain the mercury therein so as to close or bridge across the terminals 25 and 26. By making the angle between the horizontal and the plane of switch 7 sufficiently great, normal changes of inclination of a vehicle carrying the switch will not affect the bridging across the terminals 25 and 26. However, upon an impact of such force as to cause the mercury to become displaced from its normal position, the same will move to the more elevated portions of the passages and cause opening of the switch across the terminals 25 and 26. For the present purposes, the passages comprising switch 7 have been given the same reference numerals as those in switch 6, corresponding passages and portions carrying primed numbers.

Since the trap 17' of the switch 7 is lower than the uppermost portions of the passages 16' and 18', any displacement of mercury into said trap will be retained therein and can bleed back to terminal-bridging position only through the restriction afforded by the passage 23'.

The ignition circuit 8 comprises the mentioned switch 9 and source of current 10, these two components being connected to terminal 25, in the manner shown. Thus, the circuit continues through the mercury 15', terminal 26, connection 27, terminal 22, mercury 15, terminal 21, back to ground. Thus, the two switches 6 and 7 are in series and both must be closed in order for the ignition circuit to be closed. Upon opening of either of the switches, said circuit will be opened.

Since the switches 6 and 7 preferably include a 90° angle between them, said switches are each tilted at 45° to the horizontal (perhaps most easily seen in Fig. 4). Since the diverging groove passages 14 and 14' diverge at 90° relative to each other, it will be seen that impact in any direction will cause the mercury 15 and/or 15' to run upwardly along said groove passages 14 and/or 14' either to trap 17 or trap 17'. Each passage 14 and 14' is disposed at a compound angle that is at 45° to the plane of movement thereof and 45° to a transverse plane. Hence, such displacement of mercury is toward one of the traps 17 or 17' during impact, regardless of the direction of the impact. Since each switch also includes a bleed return passage, the mentioned time delay for restoring the switches to closed position is effective.

By providing terminals 28 and 29 at the passage portions 16 of the switch 6 and connecting said terminals, as by conductors 30 and 31, to a light bulb 32, a flashing circuit that comprises said light bulb may be provided to indicate exaggerated but not too dangerous lateral tipping of the vehicle that carries the switch. Upon such tipping, the circuit, from the line 27, follows the terminal 22, the mercury 14, and either terminal 28 or 29 (according to which direction the switch is being tilted or tipped), to lamp bulb 32 through lines 30 or 31 and so to the ground.

It will be seen from the foregoing that a safety switch has been provided that will react to conditions of collision, roll-over, or upset in the manner desired, and that the resulting opening of the ignition circuit, unless the vehicle and switch are inverted, will be placed in condition to be closed after a time delay. Thus, the safety features of the invention are realized.

While the foregoing specification illustrates and describes what I now contemplate to be the best modes of carrying out my invention, the constructions are, of course, subject to modification without departing from the spirit and scope of my invention. Therefore, I do not desire to restrict the invention to the particular forms of construction illustrated and described, but desire to cover all modifications that may fall within the scope of the appended claims.

Having thus described my invention, what I claim and desire to secure by Letters Patent is:

1. An automotive safety switch comprising a dielectric housing formed to have two plane, relatively angularly offset parts, each part having a closed passage formed with a mercury-holding portion and a mercury-trapping portion, a pair of electric terminals entering each holding portion and bridged by a quantity of mercury in said holding portion, an ignition circuit connected in series with said pairs of terminals, and a bleed passage connection between each mercury-trapping portion and its respective mercury-holding portion to slowly return mercury from the former to the latter portion after displacement of mercury from the latter to the former portion, the mercury-holding portions each comprising two legs angularly disposed to each other connected to the mercury-trapping portion.

2. An automotive safety switch according to claim 1 in which the switch parts are at no greater angle to the horizontal than 45°.

3. An automotive safety switch according to claim 1 in which the switch parts incline upwardly and at acute angles to the horizontal.

4. An automotive safety switch comprising a dielectric housing formed to have two plane, relatively angularly offset parts, each part having a closed passage formed with a mercury-holding portion and a mercury-trapping portion, a pair of electric terminals entering each holding portion and bridged by a quantity of mercury in said holding portion, an ignition circuit connected in series with said pairs of terminals, and a bleed passage connection between each mercury-trapping portion and its respective mercury-holding portion to slowly return mercury from the former to the latter portion after displacement of mercury from the latter to the former portion, the mercury-holding portions each comprising two legs angularly disposed to each other connected to the mercury-trapping portion, each closed passage comprising diverging passage portions, re-entrantly curved extensions of the diverging portions and adjacent more sharply curved continuations of the curved extensions, the mercury-trapping portion of the closed passage being connected across said continuations.

5. An automotive safety switch according to claim 4 the mercury-trapping portion of the closed passage comprising oppositely directed relatively straight extensions of the curved continuations, and a connecting passage across the opposite ends of said straight extensions.

6. An automotive safety switch according to claim 4 the mercury-trapping portion of the closed passage comprising oppositely directed relatively straight extensions of the curved continuations, and a connecting passage across the opposite ends of said straight extensions, the bleed passage being connected to said connecting passage.

7. An automotive safety switch comprising a dielectric housing formed to have two plane, relatively angularly offset parts, each part having a closed passage formed with a mercury-holding portion and a mercury-trapping portion, a pair of electric terminals entering each holding portion and bridged by a quantity of mercury in said holding portion, an ignition circuit connected in series with said pairs of terminals, a bleed passage connection between each mercury-trapping portion and its respective mercury-holding portion to slowly return mercury from the former to the latter portion after displacement of mercury from the latter to the former portion, and means to signal relatively small lateral tipping of the switch and comprising a second pair of terminals entering the closed passage of one of the mentioned parts, and a signal circuit connected across said latter terminal to signal tipping.

8. An automotive switch according to claim 7 in which the angle between the mentioned two parts is approximately 90° and the angle of each part, in use, is 45° to the horizontal.

9. An automotive switch according to claim 8, the mercury-holding portion of each switch comprising diverging passages that have an included angle of 90° and extend to and connect with the trap.

10. In an automotive safety switch two mercury-holding parts at 90° to each other and 45° to the horizontal, each part comprising diverging grooves that have an included angle of 90°, said grooves each, thereby, being disposed at compound 45° angles with respect to two transverse planes both normal to the horizontal, a mercury-trapping part connected across the two diverging grooves of each mercury-holding part, and a bleed passage connecting each said trap and the apex of jointure of the respective diverging grooves to return mercury from said traps to said grooves.

11. In an automotive safety switch for a vehicle normally traveling along a predetermined line in the vehicle and normally occupying a position in which a second line perpendicular to said predetermined line lies in a horizontal plane with said first line, the combination of two mercury-holding parts at 90° to each other and at 45° to said second line, each part comprising diverging grooves that have an included angle of 90°, said grooves each being thereby disposed at angles of 45° with respect to said first line, and a mercury-trapping part connected across the two diverging grooves of the mercury-holding part, curving reentrant passageways joining each mercury-holding part to each mercury-trapping part for causing mercury to be driven from the mercury-holding part into the mercury-trapping part and retained therein by impact resulting from force applied in either direction along either of said lines.

12. An automotive safety switch comprising a mercury-holding part in V-shape with the apex of the V normally downward, and a mercury-trapping part comprising a substantially horizontal passageway above the mercury-holding part, a pair of curving reentrant passageways forming connections between the mercury-trapping part and the mercury-holding part to form a closed continuous mercury receptacle whereby the application of impact force to the vehicle at an angle to either portion of the V results in mercury being driven out of the mercury-holding part along one of said re-entrant passageways into the mercury-trapping portion and retained therein, and a bleed passageway being provided between the mercury-trapping part and the mercury-holding part to restore mercury from the mercury-trapping part to the mercury-holding part after a time delay.

13. An automotive safety switch comprising two mercury-holding parts in V-shape at 90° to each other and at 45° to a line which is normally a horizontally crosswise line in a vehicle, with the apex of the V normally downward, and a mercury-trapping part comprising a substantially horizontal passageway above the mercury-holding part, a pair of curving re-entrant passageways forming connections between the mercury-trapping part and the mercury-holding part to form a closed continuous mercury receptacle whereby the application of impact force to the vehicle at an angle to either portion of the V results in mercury being driven out of the mercury-holding part along one of said re-entrant passageways into the mercury-trapping portion and retained therein, whereby the switch responds to transverse horizontal impact and transverse rotating impact, as well as to forward or backward impact, and to pitch impact of the vehicle.

References Cited in the file of this patent

UNITED STATES PATENTS

| | | |
|---|---|---|
| 1,998,254 | Scott | Apr. 16, 1935 |
| 2,056,052 | Mason | Sept. 29, 1936 |
| 2,392,829 | Allison | Jan. 15, 1946 |
| 2,692,312 | West | Oct. 19, 1954 |
| 2,782,276 | Woods | Feb. 19, 1957 |

FOREIGN PATENTS

| | | |
|---|---|---|
| 102,904 | Austria | Mar. 25, 1926 |
| 742,191 | France | July 19, 1932 |

OTHER REFERENCES

Durakool Tipover Switch, Form 54–12–37 10M (Durakool, Inc., Elkhart, Ind.), received January 12, 1937.